United States Patent
Gallet

(10) Patent No.: US 10,661,910 B2
(45) Date of Patent: May 26, 2020

(54) AIRCRAFT COMPRISING A TURBINE ENGINE INCORPORATED INTO THE REAR FUSELAGE COMPRISING A SYSTEM FOR BLOCKING THE FANS

(71) Applicant: SAFRAN AIRCRAFT ENGINES, Paris (FR)

(72) Inventor: François Gallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 30 days.

(21) Appl. No.: 15/745,661

(22) PCT Filed: Jul. 21, 2016

(86) PCT No.: PCT/FR2016/051887
§ 371 (c)(1),
(2) Date: Jan. 17, 2018

(87) PCT Pub. No.: WO2017/013365
PCT Pub. Date: Jan. 26, 2017

(65) Prior Publication Data
US 2018/0209443 A1    Jul. 26, 2018

(30) Foreign Application Priority Data

Jul. 22, 2015 (FR) ..................... 15 56947

(51) Int. Cl.
*F02K 3/072* (2006.01)
*B64D 29/04* (2006.01)
(Continued)

(52) U.S. Cl.
CPC ............ *B64D 29/04* (2013.01); *B64C 11/002* (2013.01); *B64C 11/306* (2013.01);
(Continued)

(58) Field of Classification Search
CPC ...... F01D 17/14; F01D 17/145; F01D 17/148; F01D 17/16; F01D 17/162; F01D 17/167;
(Continued)

(56) References Cited

U.S. PATENT DOCUMENTS 4,642,029 A * 2/1987 Cedoz .................. B64C 11/325
416/129
9,616,992 B2 * 4/2017 Belmonte ............... B64C 11/38
(Continued)

FOREIGN PATENT DOCUMENTS

DE    2119288 A1    11/1972
DE    3834511 A1    4/1990
(Continued)

OTHER PUBLICATIONS

International Search Report dated Nov. 21, 2016, issued in corresponding International Application No. PCT/FR2016/051887, filed Jul. 21, 2016, 2 pages.
(Continued)

*Primary Examiner* — William H Rodriguez
*Assistant Examiner* — Kyle Robert Thomas
(74) *Attorney, Agent, or Firm* — Christensen O'Connor Johnson Kindness PLLC

(57) ABSTRACT

An aircraft comprising a fuselage and propelled by a turbine engine having two coaxial and contrarotating fans, the turbine engine comprising a power turbine having two contrarotating rotors, one of which drives a fan upstream from the turbine, the other a fan downstream from the turbine, each fan comprising a ring of blades, and the assembly of the fans and the power turbine being incorporated at the rear of the fuselage, in the extension of same. The aircraft comprises, for at least one of the fans, a device for blocking the rotation of the fan and a device configured to modify the pitch of the blades of the fan in such a way as
(Continued)

to make it operate as a flow straightener with respect to the other fan.

28 Claims, 2 Drawing Sheets

(51) Int. Cl.
| | |
|---|---|
| *F01D 21/06* | (2006.01) |
| *F01D 17/16* | (2006.01) |
| *B64C 11/32* | (2006.01) |
| *B64C 11/00* | (2006.01) |
| *F01D 1/24* | (2006.01) |
| *F01D 1/02* | (2006.01) |
| *B64C 11/38* | (2006.01) |
| *F01D 17/14* | (2006.01) |
| *B64C 11/30* | (2006.01) |
| *B64D 27/14* | (2006.01) |
| *B64D 27/20* | (2006.01) |
| *F02K 3/12* | (2006.01) |

(52) U.S. Cl.
CPC .......... *B64C 11/325* (2013.01); *B64C 11/385* (2013.01); *B64D 27/14* (2013.01); *B64D 27/20* (2013.01); *F01D 1/023* (2013.01); *F01D 1/24* (2013.01); *F01D 17/14* (2013.01); *F01D 17/16* (2013.01); *F01D 17/162* (2013.01); *F01D 17/167* (2013.01); *F01D 21/06* (2013.01); *F02K 3/072* (2013.01); *F02K 3/12* (2013.01)

(58) Field of Classification Search
CPC ... F01D 1/023; F01D 1/24; F02K 3/00; F02K 3/02; F02K 3/025; F02K 3/072; F02K 3/12; F05D 2240/128; F04D 29/563; B64C 11/48; B64C 11/50; B64C 11/002; B64C 11/306; B64C 11/325; B64C 11/385; B64D 27/14; B64D 27/20; B64D 29/04
See application file for complete search history.

(56) References Cited

U.S. PATENT DOCUMENTS

| | | | |
|---|---|---|---|
| 2004/0060347 A1* | 4/2004 | Comperat | F01D 21/045 73/66 |
| 2006/0042226 A1* | 3/2006 | Trumper | F01D 21/006 60/204 |
| 2011/0305575 A1* | 12/2011 | Balk | B63H 3/06 416/170 R |
| 2013/0052016 A1* | 2/2013 | Szymandera | B64C 11/308 416/128 |
| 2014/0154076 A1* | 6/2014 | Belmonte | B64C 11/38 416/154 |
| 2015/0291285 A1* | 10/2015 | Gallet | F01D 13/02 415/60 |

FOREIGN PATENT DOCUMENTS

| | | | | |
|---|---|---|---|---|
| FR | 2997681 A1 | | 5/2014 | |
| FR | WO 2014072615 A1 | * | 5/2014 | ............ F01D 13/02 |
| GB | 1196588 A | * | 7/1970 | ............ B64C 11/30 |

OTHER PUBLICATIONS

Written Opinion of the International Searching Authority dated Nov. 21, 2016, issued in corresponding International Application No. PCT/FR2016/051887, filed Jul. 21, 2016, 5 pages.

* cited by examiner

AIRCRAFT COMPRISING A TURBINE ENGINE INCORPORATED INTO THE REAR FUSELAGE COMPRISING A SYSTEM FOR BLOCKING THE FANS

FIELD OF THE DISCLOSURE

Embodiments of the present disclosure relate to the field of aircraft such as aeroplanes, in particular commercial aeroplanes, propelled by a turbine engine having contra-rotating fans, integrated in the extension of the fuselage downstream thereof. It relates more particularly to the means for adapting the fans of the turbine engine in this type of architecture to specific operating situations which have to be taken into account for safety reasons.

BACKGROUND

FR-A1-2 997 681 proposed a new aircraft architecture which makes it possible to reduce the noise pollution and fuel consumption of the aircraft by limiting the aerodynamic drag through absorption of the boundary layer.

In such an architecture, an aircraft is propelled by a turbine engine having ducted contra-rotating fans, the turbine engine being integrated at the rear of the fuselage of the aircraft. Generally, the turbine engine comprises two gas generators which feed a power turbine having two contra-rotating rotors for driving two fans arranged downstream of the gas generators. The gas generators have distinct lateral air intakes to feed each of them. Downstream of the gas generators, the fans are arranged in the extension of the fuselage of the aircraft and are generally powered by an annular ring connected thereto so as to absorb at least some of the boundary layer formed around the fuselage. The diameter of the fans is approximately the same as that of the fuselage where the cross section thereof is greatest. The rotational speed of the fans is generally lower than for conventional turbine engines, in particular so that the speed at the blade tip is subsonic.

DE 3834511 A proposed a fan propulsion device comprising two contra-rotating propellers, each rotated by an engine. The two engines are coaxial, and if one of the two engines fails, the fan stops, and the other fan continues to operate.

However, the possibility of one of the fans malfunctioning, for example becoming imbalanced, or even losing a blade, must be taken into account. In this case, even if the engine is not malfunctioning, the fan rotor must be shut down to allow the aircraft to return to an airport.

The object of the present disclosure is to propose a way of shutting down the rotor so as to have the best possible operating conditions in this downgraded mode for returning to an airport.

A secondary object of the disclosure is to determine when the malfunctioning rotor must be shut down.

SUMMARY

For this purpose, embodiments of the present disclosure relate to an aircraft comprising a fuselage and propelled by a turbine engine having two coaxial and contra-rotating fans, the turbine engine having a power turbine having two contra-rotating rotors, one driving a fan upstream of the turbine, the other driving a fan downstream of the turbine, each fan having a ring of blades, and the assembly of the fans and turbine being integrated at the rear of the fuselage, in the extension thereof, the aircraft comprising, for at least one of the fans, a device for locking the rotation of the fan, means designed to modify the pitch of the blades of the fan so as to operate the fan as a guide vane assembly in relation to the other fan, and a locking device having braking means which make it possible to rigidly connect the rotor of the power turbine driving the corresponding fan to an immovable casing of the turbine engine.

According to one feature of the disclosure, the braking means are for example disc brakes.

The pitch of the blades of a fan corresponds to an angular orientation thereof around a radius that starts from the axis of rotation and passes through the blades. When the fan is in rated operation, the pitch of the blades is defined in such a way that the blades communicate an axial speed to the incident flow. In so doing, the blades also communicate a rotational movement thereto. When the pitch of the blades corresponds, for example, to an orientation of the blades close to that of the axis of the fan, and when the fan is shut down, the blades can no longer accelerate the flow, but the blades can, however, straighten the flow, that is to say reduce the rotational movement thereof. In practice, the pitch angles corresponding to these different operating modes depend on the characteristics of the incident flow.

The disclosure achieves its object at least for the fan corresponding to the rotor equipped with the means for locking when the fan is malfunctioning. It should be noted that the turbine is still configured to provide a certain level of power, the shut-down rotor playing a role similar to that of the stator in a turbine of a conventional turbine engine. By contrast, the pitch in the guide vane assembly mode of the blades of the shut-down fan makes it possible to optimize the thrust supplied by the fans in this configuration.

The braking means make it possible to efficiently and steadily shut down the damaged fan.

Furthermore, the braking means are thus arranged according to the arrangement of the propulsion assembly with the power turbine for driving one of the two contra-rotating fans which are rigidly connected to the turbine rotors.

According to one embodiment, the two rotors comprise a first rotor and a second rotor, the braking means comprising first braking means, which are associated with the first rotor of the power turbine, and second braking means, which are associated with the second rotor of the power turbine.

According to another embodiment, the two rotors comprise a first rotor and a second rotor, the blades of the first rotor extend radially inwards relative to a longitudinal axis of the turbine engine, and the blades of the second rotor extend radially outwards relative to the longitudinal axis. Advantageously, braking means for the downstream fan are mounted in a centerbody that is located downstream of the power turbine and surrounded by the primary flow passing through the turbine.

Advantageously, the turbine engine comprises the means for modifying the pitch of the blades, the means having a mechanism that rotates a pitch rod for adjusting the pitch of each blade of the downstream fan and is designed to also adjust the operability of the fan.

Preferably, likewise, braking means for the upstream fan are mounted upstream of the power turbine.

In this case, the support of the blades of the upstream fan advantageously comprises a device which is designed to allow the blades of the upstream fan to rotate about an axis that is radial relative to the rotation of the fan, and to apply an elastic return of the orientation of the blades from a pitch corresponding to fan operation to a pitch corresponding to guide vane assembly operation.

Such an aircraft can further comprise means for detecting the imbalance on one of the fan rotors by means of at least one accelerometer which is oriented radially relative to the rotation of the fans. The presence of means for detecting an imbalance makes it possible to measure in particular the vibrations caused by an imbalance in the fans and to make an informed decision as to the best solution to apply to optimize the flight.

Preferably, the aircraft comprises at least two accelerometers which are angularly offset relative to the rotation of the fans. Even more preferably, the two accelerometers are offset by an angle which is substantially equal to 90°. This makes it possible to detect the direction of rotation of the imbalance and therefore to identify the defective fan.

Lastly, embodiments of the disclosure relate in particular to an aircraft wherein at least two gas generators feed the power turbine, the generators being fed in turn by distinct air intakes arranged at the periphery of the fuselage of the aircraft.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
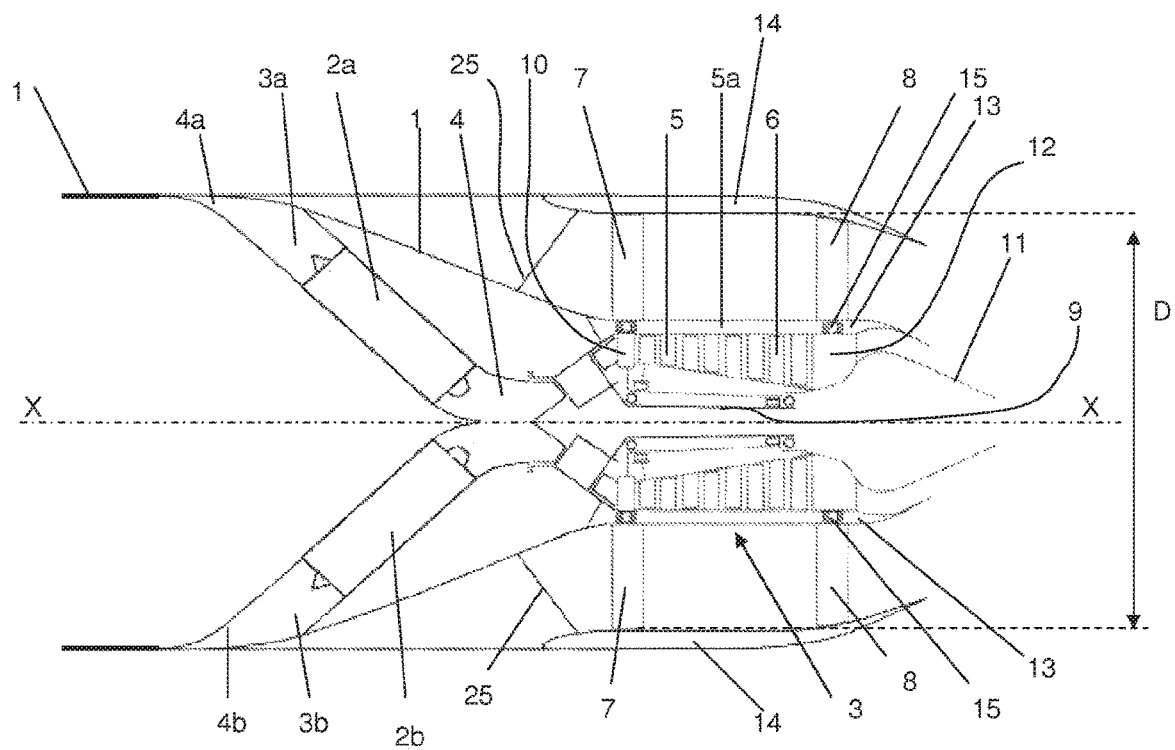
FIG. 1 is a schematic, longitudinal sectional view through the rear portion of an aircraft equipped with a turbine engine according to the disclosure.

The disclosure is applicable in particular to an aircraft, such as an aeroplane, comprising a turbine engine of the type shown in FIG. 1.

As shown in FIG. 1, the turbine engine is centered on the longitudinal axis XX of the fuselage 1 of the aircraft. The turbine engine comprises, from upstream to downstream in the direction of flow of the gases, two separate gas generators 2a, 2b simultaneously feeding a single power turbine 3. The turbine engine is mounted at the downstream end of the fuselage 1 of the aircraft.

In a manner known per se, each gas generator 2a, 2b comprises at least a compressor, a combustion chamber and a turbine (not shown in the drawings).

In this document, the terms axial and radial refer to the axis XX of the fuselage and of the turbine engine. Likewise, the terms upstream and downstream refer to the main direction of flow along the axis.

Each gas generator 2a, 2b is received inside a primary flow duct 3a, 3b. Distinct air intakes 4a, 4b are provided for the ducts 3a, 3b in order to feed each gas generator 2a, 2b. In the example shown, the air intakes 4a, 4b are connected to the fuselage 1 of the aircraft, upstream of the gas generators 2a, 2b, and the inner wall thereof is integrated directly in the fuselage 1. The intakes thus absorb some of the boundary layer formed around the fuselage 1 of the aircraft. In another configuration (not shown), the lateral air intakes feeding each of the gas generators can, conversely, be at a distance from the fuselage 1 of the aircraft so as to minimize this phenomenon of absorbing the boundary layer and facilitate the operation of the gas generators. It is also conceivable to use more than two gas generators, for example three, to feed the power turbine 3.

Preferably, the two primary flow ducts 3a, 3b of the gas generators 2a, 2b converge on the longitudinal axis XX and form therebetween a V which is open upstream, the opening angle of which is preferably between 80° and 120°.

The two primary flow ducts 3a, 3b of the gas generators 2a, 2b converge into a central primary duct 4 which feeds the power turbine 3. A mixer (not shown in the drawings) is preferably positioned in the region of the convergence zone of the two ducts 3a, 3b receiving the gas generators 2a, 2b. The function of the mixer is to mix the gaseous flows from the two gas generators 2a, 2b to create a single, homogeneous gaseous flow at the output of the central primary duct 4.

The power turbine 3, which is fed by the primary flow at the output of the central duct 4, is equipped with two contra-rotating turbine rotors 5, 6 for driving two fans 7, 8 in a contra-rotating manner. The turbine rotors 5, 6 are coaxial and centered on the longitudinal axis XX. The rotors rotate about a central casing 9 secured to the structure of the aircraft.

In this case, a first turbine rotor 5 corresponds to blades connected to a tubular member 5a separating the primary flow duct, in the power turbine 3, from the secondary flow duct, in which the fans 7, 8 are located. In other words, the blades of the first rotor 5 extend radially inwards. The blades and the tubular member 5a of the first rotor 5 are connected to the bearings for supporting the rotor 5 on the inner casing 9 by support arms 10 which pass through the primary duct upstream of the power turbine 3.

In the same example, the second rotor 6 corresponds to blades that are connected to a radially inner wall of the primary duct in the turbine 3 and fitted longitudinally between the blades of the first rotor 5. The blades of the second rotor 6 extend radially outwards.

Downstream of the power turbine 3, the radially inner portion of the second rotor 6 is extended by a centerbody 11. Secondly, the portion is connected, by support arms 12, to a ring 13 for supporting the blades of the downstream fan 8. In addition, the ring 13 extends the tubular member 5a of the first rotor 5 and comprises an extension to the rear so as to form, together with the centerbody 11, a primary exhaust nozzle at the output of the power turbine 3.

In the example shown, a first, upstream fan 7 is positioned in the region of the intake of the power turbine 3. The fan is connected to the first rotor 5 in the region of the arms 10 which support the cylindrical outer member 5a upstream. The upstream fan 7 thus rotates at the same speed as the first rotor 5 of the power turbine 3.

In the same example, the second, downstream fan 8 is positioned in the region of the output of the power turbine 3. The fan is connected to the second rotor 6 in the region of the support ring 13 and the arms 12 which support the ring. The downstream fan 8 thus rotates at the same speed as the second rotor 6 of the power turbine 3.

The two fans 7, 8 are ducted by a nacelle 14 secured to the structure of the aircraft. The nacelle 14 is secured in particular, in this case, to the vertical tail unit of the aircraft (not shown in the drawings). The fans have an outer diameter D which corresponds substantially to the greatest outer diameter of the fuselage 1 of the aircraft.

Since the air entering the fans 7, 8 is partially composed of the boundary layer of the fuselage of the aircraft, the speed at the intake is low in relation to conventional turbine engine fans, and the speed at the output is also lower at the same compression rate, and this improves the propulsive and acoustic performance of the fans. Furthermore, the large outer diameter D of the fans 7, 8 means that the rotational speed thereof, as with that of the rotors 5, 6 of the power turbine 3, will also stay low in relation to a conventional turbine engine.

Furthermore, in the example shown, the turbine engine further comprises a stator 25, formed by a ring of vanes connecting the nacelle 14 to the fuselage 1 upstream of the upstream fan 5. Advantageously, the stator 25 can be used to improve the output of the upstream fan 7, for example by acting as a guide vane assembly.

Figure 2:
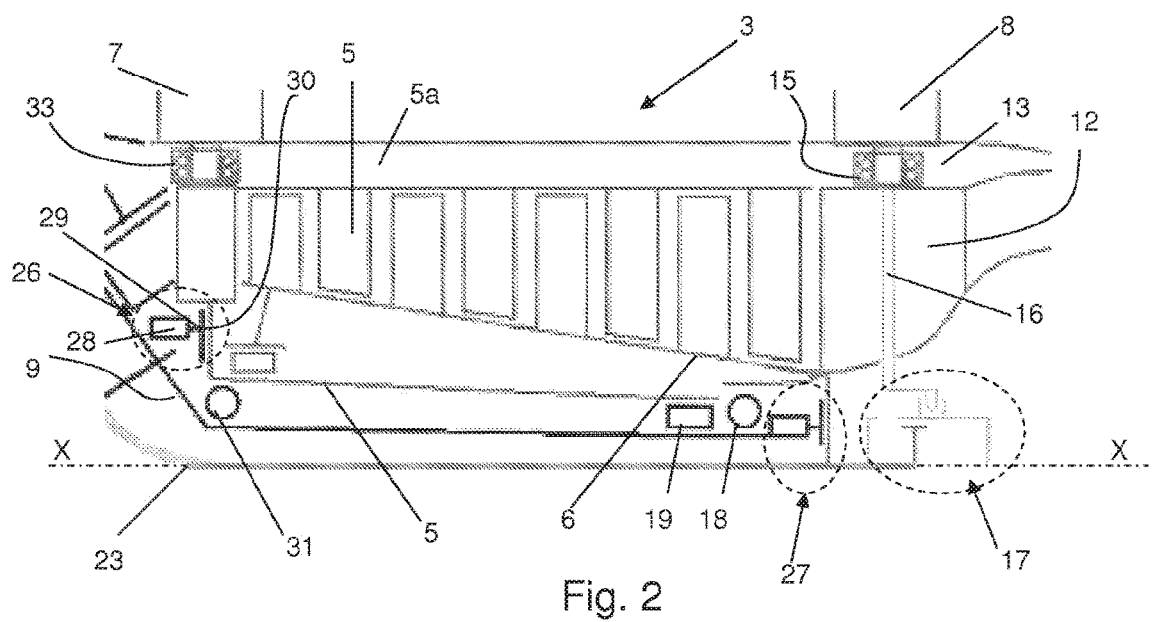
FIG. 2 is a schematic, longitudinal half-sectional view through the turbine engine in the region of the power turbine and the fans.

According to a first aspect of the disclosure, with reference to FIG. 2, first braking means 26 are associated with the first rotor 5 of the power turbine 3, and second braking means 27 are associated with the second rotor 6 of the power turbine 3.

The braking means can be activated independently, so as to select the rotor which has to be shut down.

In this case, the braking means 26, 27 are in the form of discs which are rigidly connected to the central casing 9 and bear against a corresponding portion of the turbine rotors 5, 6.

With reference to FIG. 2, the portion rigidly connected to the central casing 9 of the first braking means 26 can be received in a free space between the central casing 9 and the front portion of the first rotor 5. In a known manner, a piston 28 pushes a disc 29 against a portion 30 of the web of the first rotor 5 located, on the longitudinal axis XX, in line with the upstream fan 7. It may also be noted that a bearing 31 for guiding the first rotor 5 on the central casing 9 is located nearby.

In this way, the first rotor 5 is locked by the braking means in the region where the forces are exerted on the rotor 5 by the upstream fan 7. Torques are thus prevented from being exerted between the braking means 26 and the upstream fan 7 over the length of the first rotor 5 when it is shut down.

Furthermore, the braking means 27 of the second rotor 6 is located at the rear of the power turbine 3, close to the downstream fan 8 driven by the second rotor 6.

Figure 3:
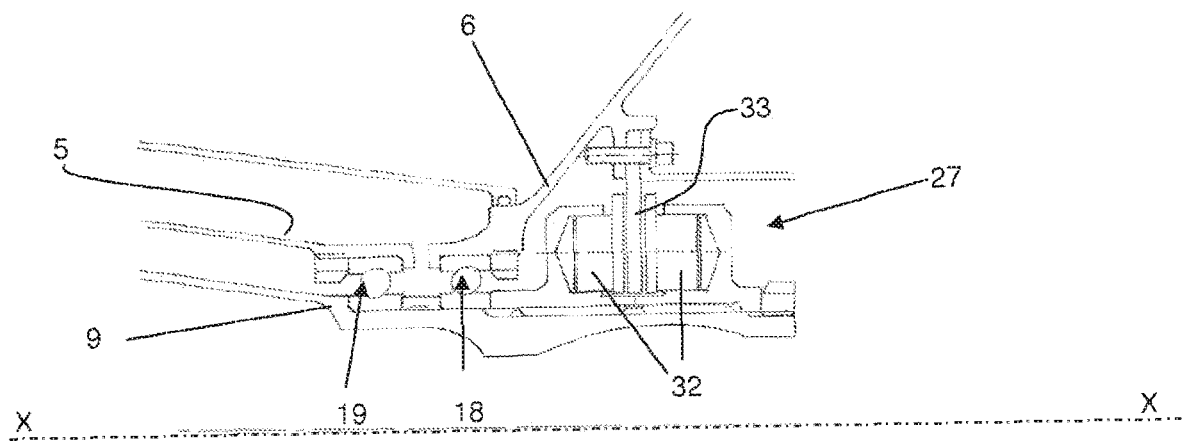
FIG. 3 is a schematic, longitudinal sectional view of an embodiment of a rotor brake close to the symmetry axis, behind the power turbine.

FIG. 3 shows an embodiment for receiving the braking means 27 in a compact manner in this region of the turbine engine. FIG. 3 shows the rear of the central casing 9 supporting a first bearing 18 for the second rotor 6, just behind a second bearing 19 for the first rotor 5. The central casing 9 is extended towards the rear of the bearing 18 of the second rotor 5 by a cylindrical portion which supports a plurality of circumferentially distributed jaws 32 on its periphery. The jaws 32 surround a disc 33 which is rigidly connected to the second rotor 6. The assembly is placed under the portion of the rotor 6 defining the primary flow duct at the output of the power turbine. By moving towards one another, the jaws 32 can thus press down on the disc 33 and shut down the rotor 6 without exerting any longitudinal force thereon.

Furthermore, the central casing 9 is kept hollow around the longitudinal axis XX, and this makes it possible to allow the passage of actuation means for the jaws 32 of the braking means 27, as well as for other means which may be placed further downstream.

According to another aspect of the disclosure, in the example shown, the blades of the downstream fan 8 are mounted together with a device for varying their angular pitch relative to a meridian plane in relation to the longitudinal axis XX. For this purpose, with reference to FIG. 2, the blades are mounted, in this case, together with a system of bearing races 15 on the support ring 13 and each rotate about a radial rod 16 which passes through a support arm 12 of the ring 13.

Figure 4:
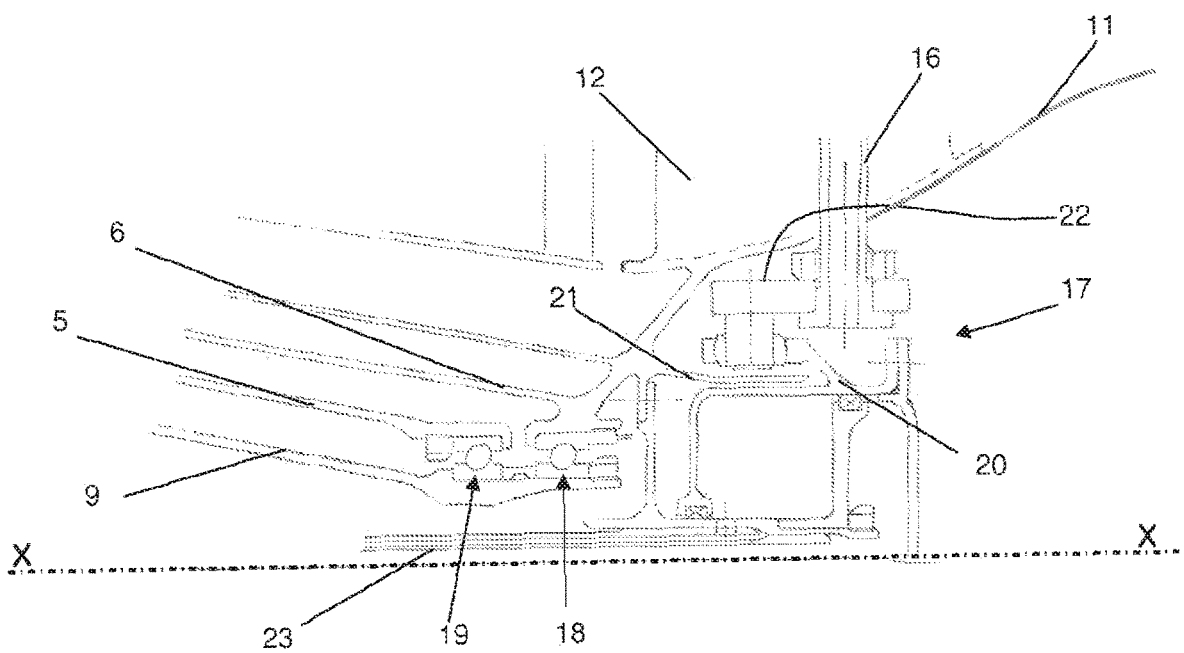
FIG. 4 is a schematic, longitudinal sectional view of an embodiment of a device for varying the pitch of the blades of a fan close to the symmetry axis, behind the power turbine.

With reference to FIG. 4, the radial rods 16 of the blades are rotated by a device 17 having small connecting rods close to the longitudinal axis XX. The device 17 comprises a cylindrical portion 20 which is movable in translation along the longitudinal axis XX into a recess 21 in the second rotor 6. For each blade of the downstream fan 8, the movable portion 20 is connected to a small connecting rod 22 which is in turn rigidly connected to the radial rod 16 of the blade. By the translational movement thereof, the movable portion 20 drives each small connecting rod 22 secured to the radial rod 16 of a blade and rotates the rod 16 about its axis.

The whole device 17 is received, in a compact manner, in the centerbody 11, just downstream of the rolling bearing 18 of the second rotor 6 of the power turbine 3 and under the ring of the support arms 12. In the depiction shown in FIG. 4, the braking device 26 has not been shown in order to avoid overloading the drawing. With reference to FIG. 2, the braking device 27 is mounted in this case between the bearing 18 of the second rotor 6 and the device 17 for controlling the pitch of the blades of the downstream fan 8.

Furthermore, the translational movement of the movable portion 20 can be controlled by a system of control rods 23 passing inside the central casing 9. The control rods 23 can be actuated by actuators (not shown in the drawings) placed inside the fuselage 1 of the aircraft, upstream of the power turbine 3.

Lastly, the longitudinal displacement travel of the translatable portion 20 of the device 17 is designed in this case so as to be able to rotate the blades of the downstream fan 8 about their axis by an angle which is sufficient for the blades to function as a stator straightening the flow originating from the upstream fan 7 when the second rotor 6 of the turbine 3 and the downstream fan 8 are shut down, while the upstream fan 7 is still driven by the first rotor 5 of the turbine 3 to maintain propulsion of the aircraft.

The overall dimensions in the region of the upstream fan 7 do not make it possible here to mount a pitch device for adjusting the pitch of the blades of the upstream fan 7 similar to that of the downstream fan 8.

According to an additional aspect of the disclosure, the blades of the upstream fan 7 are mounted, in this case, together with a system of bearing races 33 on a support ring formed by the front of the outer cylindrical member 5*a* of the first rotor 5 which separates the primary flow and secondary flow ducts in the region of the power turbine 3. Each blade can thus rotate in the bearing races 33 about a radial rod (not shown in the drawing).

However, the rotation of the blades of the upstream fan 7 about the axial rods thereof is stop-limited between a first position and a second position. The first position corresponds to a pitch adapted to the normal operation of the upstream fan 7 rotating in different operating regimes of the turbine engine. The second position corresponds to a pitch adapted to operation of the upstream fan 7 as a guide vane assembly for the downstream fan 8, when it is the upstream fan 7 which is shut down and the downstream fan 8 is driven to maintain the propulsion of the aircraft.

In addition, the bearing races 33 of the blades of the upstream fan 7 are equipped with a resilient device which exerts a force for returning from the first position to the second position. The resilient device is calibrated so that, when the upstream fan 7 rotates, the torque from the centrifugal forces holds each blade in the first position. The resilient device can be formed, for example, by an assembly of springs on each bearing race 33 or by an elastomer ring.

Secondly, the immovable structure of the turbine engine, for example the portion which is located upstream of the central casing 9 of the power turbine 3, advantageously comprises two accelerometers offset by 90° azimuthally around the longitudinal axis XX. The two accelerometers thus make it possible to measure in particular the vibrations caused by an imbalance in the fans 7, 8 or even due to the loss of one of the blades.

In this manner, the operation of the assembly during an accident sequence can be described schematically as follows, for an aircraft according to the disclosure and equipped with an on-board computer.

When the turbine engine is in operation and one of the fans becomes damaged, leading to a major imbalance, the accelerometers detect the presence of the failure and make it possible to carry out the diagnosis, by means of appropriate computer processing in the on-board computer, determining which fan has to be shut down.

If the downstream fan 8 has to be shut down, the on-board computer can order the corresponding braking system 27 to shut down the fan. At the same time, the computer orders the pitch device 17 for adjusting the pitch of the blades to put the downstream fan 8 in the guide vane assembly mode and adjusts the engine parameters to allow the upstream fan 7 to be driven correctly in this configuration.

If the upstream fan 7 has to be shut down, the on-board computer can order the corresponding braking system 26 to shut down this fan and adjusts the engine parameters to allow the downstream fan 8 to be driven correctly in this configuration. In this case, when the upstream fan 8 stops, the resilient devices on the bearing races 33 of the blades of the fan automatically bring the pitch of the blades into abutment against the second position, corresponding to a guide vane assembly mode of operation for the upstream fan 7.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An aircraft comprising:
   a fuselage having a rear;
   a turbine engine having a first fan and a second fan which are coaxial to a longitudinal axis and being contra-rotating, the turbine engine also having a power turbine having first and second contra-rotating rotors, the first rotor driving the first fan upstream of the power turbine, the second rotor driving the second fan downstream of the power turbine, each first and second fan having a ring of blades, the first and second fans and the power turbine being integrated at the rear of the fuselage, in extension thereof,
   wherein at least two gas generators feed the power turbine, said gas generators being fed in turn by distinct air intakes arranged at a periphery of the fuselage of the aircraft,
   said first and second rotors are coaxial, centered on the longitudinal axis, the first and second rotors rotate about an immovable casing which is secured to a structure of the aircraft,
   wherein the turbine engine comprises:
      a lock that is configured to lock the rotation of at least one fan of the first and second fans which is malfunctioning, the lock having a brake configured to rigidly connect one rotor of the first and second rotors of the power turbine driving said at least one fan of the first and second fans to the immovable casing of the turbine engine; and
      a variable pitch device configured to modify a pitch of the blades of at least one fan of the first and second fans to operate said at least one fan of the first and second fans as a guide vane assembly in relation to the other fan of the first and second fans which is driven in rotation by the corresponding first or second rotor that is not locked,
   wherein the blades of the at least one fan of the first and second fans rotates between:
      a first position corresponding to a normal operation of said at least one an of the first and second fans with said blades being arranged to authorize an incident flow, and
      a second position in which said at least one fan of the first and second fans is malfunctioning and locked, said blades acting as a guide vane assembly.

2. The aircraft according to claim 1, wherein the brake is mounted in a centerbody that is located downstream of the power turbine and surrounded by a primary flow passing through the power turbine.

3. The aircraft according to claim 2, wherein said variable pitch device comprises a mechanism that rotates a pitch rod for adjusting the pitch of each blade of the second fan.

4. The aircraft according to claim 1, wherein the brake is mounted upstream of the power turbine.

5. The aircraft according to claim 4, wherein a support of the blades of the first fan comprises a device which is configured to allow the blades of the first fan to rotate about an axis that is radial relative to the rotation of the fan, and to apply an elastic return of an orientation of said blades from a first pitch corresponding to fan operation to a second pitch corresponding to guide vane assembly operation.

6. The aircraft according to claim 1, further comprising at least one accelerometer which is oriented radially relative to the rotation of the first and second fans and is configured to detect an imbalance of at least one of the rotors.

7. The aircraft according to claim 6, comprising at least two accelerometers which are angularly offset relative to the rotation of the fans.

8. The aircraft according to claim 1, wherein the power turbine is a single power turbine.

9. The aircraft according to claim 1, wherein the first and second fans are ducted by a nacelle secured to a structure of the aircraft.

10. The aircraft according to claim 1, wherein the brake is arranged in a region where forces are exerted on at least one of the rotors by the first fan.

11. The aircraft according to claim 1, wherein the brake is associated with the first rotor of the power turbine, and a second brake is associated with the second rotor of the power turbine.

12. The aircraft according to claim 1, wherein each of said two contra-rotating rotors comprises blades, the blades of one rotor extending radially inwards relative to a longitudinal axis of the turbine engine, and the blades of the other rotor extending radially outwards relative to said longitudinal axis.

13. The aircraft according to claim 1, wherein the variable pitch device is configured to modify the pitch of the blades of the at least one fan of the first and second fans which is locked by the lock.

14. The aircraft according to claim 1, wherein the brake is arranged upstream of the variable pitch device.

15. The aircraft according to claim 1, wherein the brake is arranged in one of the first and second rotors which drives the fan, said fan having said variable pitch blades and which comprises at least a part of the power turbine.

16. The aircraft according to claim 1, wherein the brake is in line with the upstream fan.

17. The aircraft according to claim 1, wherein the brake is positioned by the downstream fan.

18. The aircraft according to claim 3, wherein the immovable casing comprising a first bearing arranged to support the rear of the immovable casing, said mechanism being placed downstream the first bearing.

19. The aircraft according to claim 9, wherein the nacelle has a radially external surface aligned with the fuselage.

20. An aircraft comprising:
a fuselage having a rear;
a turbine engine having a first fan and a second which are coaxial to a longitudinal axis and being contra-rotating, the turbine engine also having a power turbine having a first and second contra-rotating rotors, the first rotor driving the first fan upstream of the power turbine, the second rotor driving the second fan downstream of the power turbine, each first and second fan having a ring of blades, the first and second fans and the power turbine being integrated at the rear of the fuselage, in extension thereof,
wherein at least two gas generators feed the power turbine, said gas generators being fed in turn by distinct air intakes arranged at a periphery of the fuselage of the aircraft,
said first and second rotors are coaxial, centered on the longitudinal axis, said first and second rotors rotate about an immovable casing which is secured to a structure of the aircraft,
wherein the turbine engine comprises:
a lock that is configured to lock the rotation of at least one fan of the first and second fans which is malfunctioning, the lock having a first brake configured to rigidly connect the first rotor of the power turbine driving said first fan to the immovable casing of the turbine engine and a second brake configured to rigidly connect the second fan to the immovable casing of the turbine engine; and
a variable pitch device configured to modify a pitch of the blades of only one fan of the first and second fans to operate said at least one fan of the first and second fans as a guide vane assembly in relation to the other fan.

21. The aircraft according to claim 20, wherein the first brake and second brake are actionable independently.

22. The aircraft according to claim 1, wherein the immovable casing has a cylindrical portion extending downstream, said cylindrical portion supporting a first bearing for guiding the second rotor in rotation around the longitudinal axis, the cylindrical portion supporting the second brake configured to immobilize the second rotor.

23. The aircraft according to claim 22, wherein the brake comprises a plurality of circumferentially distributed jaws which surround a disc, the disc being rigidly connected to the second rotor.

24. The aircraft according to claim 3, wherein the turbine engine comprises a stator which is formed by a ring of vanes, said ring of vanes connecting the nacelle to the fuselage upstream of the first fan.

25. The aircraft according to claim 1, wherein the turbine engine comprises a ring of support arms which extend around the longitudinal axis and which extend between a support ring for supporting the blades of the second fan, a portion of the variable pitch device extending inside each support arms.

26. The aircraft according to claim 25, wherein a portion of the variable pitch device extending inside each support arms comprises the pitch rod.

27. An aircraft comprising:
a fuselage having a rear;
a turbine engine having a first fan and a second fan which are coaxial to a longitudinal axis and being contra-rotating, the turbine engine also having a power turbine having first and second contra-rotating rotors, the first rotor driving the first fan upstream of the power turbine, the second rotor driving the second fan downstream of the power turbine, each first and second fan having a ring of blades, the first and second Fans and the power turbine being integrated at the rear of the fuselage, in extension thereof,
wherein at least two gas generators feed the power turbine, said gas generators being fed in turn by distinct air intakes arranged at a periphery of the fuselage of the aircraft,
said first and second rotors are coaxial, centered on the longitudinal axis, said first and second rotors rotate about an immovable casing which is secured to a structure of the aircraft,
wherein the turbine engine comprises:
a lock that is configured to lock the rotation of at least one fan of the first and second fans which is malfunctioning, the lock having a brake configured to rigidly connect one rotor of the first and second rotor of the power turbine driving said at least one fan of the first and second fans to the immovable casing of the turbine engine, at least a part of the brake being arranged radially outside the immovable casing; and
a variable pitch device configured to modify a pitch of the blades of at least one fan of the first and second fans to operate said at least one fan of the first and second fans as a guide vane assembly in relation to the other fan of the first and second which is driven in rotation by the corresponding first or second rotor and is not locked,
wherein the blades of the at least one fan of the first and second fans rotates between:

a first position corresponding to a normal operation of said at least one fan of the first and second fans with said blades being arranged to authorize an incident flow, and a second position in which said at least one fan of the first and second fans is malfunctioning and locked, said blades acting as a guide vane assembly.

28. The aircraft according to claim 1, wherein at least a part of the brake is arranged radially outside the immovable casing.

* * * * *